United States Patent [19]

Yu

[11] Patent Number: 5,120,790
[45] Date of Patent: Jun. 9, 1992

[54] BLENDS OF COMB-SHAPED COPOLYMERS OF A MACROMOLECULAR MONOMER OF POLYLACTONE WITH POLYMER (S)

[75] Inventor: Simon H. Yu, Westlake, Ohio

[73] Assignee: The B. F. Goodrich Company, Akron, Ohio

[21] Appl. No.: 783,944

[22] Filed: Oct. 28, 1991

Related U.S. Application Data

[63] Continuation-in-part of Ser. No. 638,275, Jan. 7, 1991, Pat. No. 5,061,772, which is a continuation-in-part of Ser. No. 283,422, Dec. 12, 1988, Pat. No. 4,983,689, which is a continuation-in-part of Ser. No. 46,818, May 7, 1987, Pat. No. 4,791,189.

[51] Int. Cl.$^5$ .................. C08G 63/08; C08F 283/00
[52] U.S. Cl. .................. 525/186; 525/419; 525/420; 525/454; 525/468
[58] Field of Search ............ 525/186, 419, 420, 454, 525/468

[56] References Cited

U.S. PATENT DOCUMENTS

| | | | |
|---|---|---|---|
| 4,791,189 | 12/1988 | Yu | 528/354 |
| 4,983,689 | 1/1991 | Yu | 526/320 |
| 5,061,772 | 10/1991 | Yu | 526/320 |

Primary Examiner—Morton Foelak
Attorney, Agent, or Firm—Debra L. Pawl; Alfred D. Lobo

[57] ABSTRACT

Blends are formed with numerous commercially available resins and a comb-shaped polymer ("comb" for brevity) of a macromolecular monomer of a polylactone having terminal vinyl unsaturation so long as the polylactone chains are long enough to be compatible with one of the components to be blended. The comb may be formed with any polymerizable olefinically unsaturated monomer, preferably a vinyl, styryl, or acryloyl monomer. The vinyl unsaturation of the "head" of the macromer of polylactone may be acryloyl, styryl or allyl. The comb is made by a low temperature emulsion or suspension polymerization process. The comb, which has a hydrocarbon backbone and pendant polylactone chains, typically has a number average molecular weight of at least 10,000. A blend of first and second resins which are normally incompatible with each other, is also produced using a comb in which the backbone is compatible with one of the resins. Such blends also result with a synthetic resin and a comb in which the pendant chains consist of a first block which has a polylactone structure, and a second block which has a polyether structure, or vice versa.

21 Claims, No Drawings

BLENDS OF COMB-SHAPED COPOLYMERS OF A MACROMOLECULAR MONOMER OF POLYLACTONE WITH POLYMER (S)

BACKGROUND OF THE INVENTION

Cross-reference to related application:

This application is a continuation-in-part of Ser. No. 638,275 filed Jan. 7, 1991 now U.S. Pat. No. 5,061,772, which is a continuation-in-part of Ser. No. 283,422 filed Dec. 12, 1988, now U.S. Pat. No. 4,983,689 which is, in turn, a continuation-in-part of Ser. No. 046,818 filed May 7, 1987, issued as U.S. Pat. No. 4,791,189 on Dec. 13, 1988.

This invention relates to a polymer blend based on a comb polymer ("comb" for brevity). The comb is made by free radical polymerization of a macromolecular monomer ("macromer" for brevity) of a polylactone having one terminal group with vinyl unsaturation (referred to as a "head" group) and the other terminal group being a hydroxyl (OH) group, or, an end-capping group derived from a —OH group, or, one provided by a coupling reaction. The vinyl head may be acryloyl or methacryloyl, styryl or allyl. Hereinafter the acryloyl and methacryloyl "head" groups are together referred to as "(meth)acryloyl" groups for brevity. Any macromer of polylactone may be used, irrespective of the manner in which it is prepared, provided the macromer retains a terminal monoolefinically unsaturated vinyl group. Some other methods for preparing such macromers are referred to hereinbelow.

Any of the macromers is essentially olefinically monofunctional and has a number average molecular weight $M_n$ greater than about 1000. Each macromer may also include chains of (a) polylactone to which a polyether chain is blocked, or (b) polyether to which a polylactone chain is blocked. Such macromers with polylactone, or poly(lactone-b-ether), or, poly(ether-b-lactone), or, poly(lactone1-b-lactone2) chains are formed as described in the parent, grandparent and great-grandparent cases which are incorporated by reference thereto as if fully set forth herein. The macromer has substantially uniform molecular weight distribution, that is, a ratio of $M_w/M_n$ which is less than 5.0, preferably less than 3.

This macromer of (i) polylactone, (ii) polylactone-b-polyether block copolymer, (iii) polyether-b-polylactone block copolymer, or (iii) polylactone1-b-polylactone2 block copolymer (structures I, II, III and IV herebelow) is then copolymerized through its head group with an olefinically unsaturated copolymerizable monomer, or another monoolefinically unsaturated macromer, in a suspension or emulsion polymerization process. The copolymerization of the macromer of block copolymer with one or more conventional olefinic monomers, preferably a vinyl, styryl or acrylyl monomer, generates a comb "polymacromer" with a saturated hydrocarbon backbone having polylactone, polylactone-b-polyether, or polyether-b-polylactone branches thus resulting in the comb (also referred to as a "graft" based solely on structure with no regard as to how it is derived) copolymer in which the pendant polyether (in structure II), or polylactone (structure III) blocks respectively are farthest from the backbone. Such copolymerization of the monofunctional macromer, or of block copolymer, to form comb copolymers, differs from graft copolymerization, in the sequence of formation of the backbone relative to the formation of the pendant unit in one case, and the graft unit in the other.

The hydroxyl-terminated (meth)acryloyl macromer of polylactone has the structure

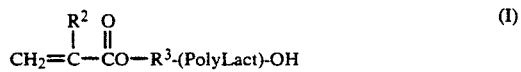

(I)

that of poly(lactone-b-ether) has the structure

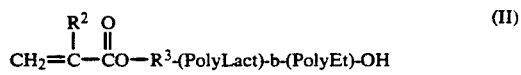

(II)

that of poly(lactone-b-ether) has the structure

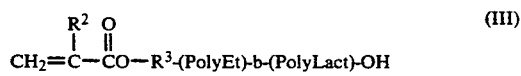

(III)

and, that of poly(lactone-b-lactone) has the structure

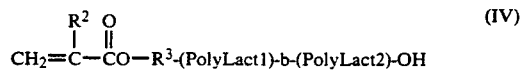

(IV)

wherein the O of the OH group is contributed by the last repeating unit of the polyether or polylactone respectively;

$R^2$ is H or $C_1-C_{20}$ alkyl, preferably lower $C_1-C_5$ alkyl, and most preferably methyl;

$R^3$ is selected from a saturated group consisting of branched or linear alkylene, haloalkylene, alkoxylene, haloalkoxylene, each $C_7-C_{20}$, aralkylene, haloaralkylene, aralkoxylene, and haloaralkoxylene, each $C_7-C_{20}$;

(PolyLact) represents a chain of lactone units; and, (PolyEt) represents a polyether block containing no active hydrogen, i.e. no hydrogen attached to oxygen, nitrogen, or sulfur, and has a number average molecular weight (mol wt) $M_n$ greater than 500, up to about 30,000.

Correspondingly, a styryl-headed macromer has a structure selected from

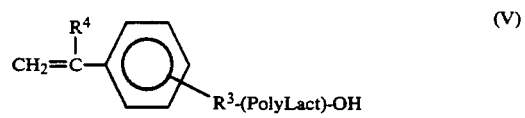

(V)

that of poly(lactone-b-ether) has the structure

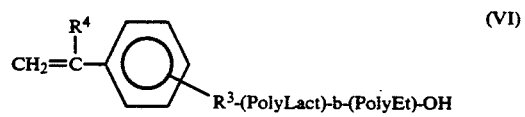

(VI)

that of poly(lactone-b-ether) has the structure

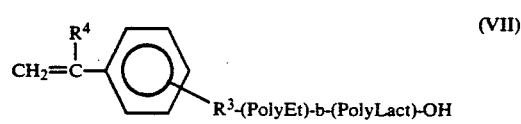

(VII)

and, that of poly(lactone-b-lactone) has the structure

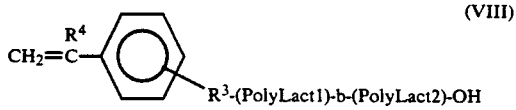
(VIII)

wherein $R^4$ is H or $C_1-C_{20}$ alkyl, preferably lower $C_1-C_5$ alkyl, and most preferably methyl.

Correspondingly, an allyl-headed macromer has a structure selected from

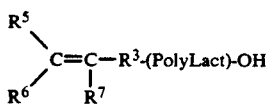
(IXa)

and

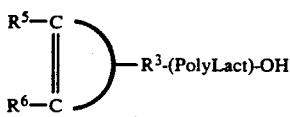
(IXb)

together written as

 (IX)

where Q represents

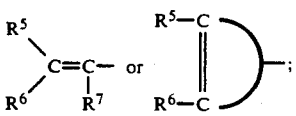

that of poly(lactone-b-ether) has the structure

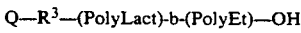 (X)

that of poly(lactone-b-ether) has the structure

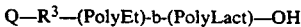 (XI)

and, that of poly(lactone-b-lactone) has the structure

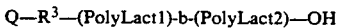 (XII)

The most widespread use of a functionalized macromer is to form a copolymer with another comonomer, each comonomer being chosen to provide desirable physical and chemical properties in a particular polymer system in which, typically, the copolymer is blended.

The criteria which resulted in the peculiar effectiveness of a suspension or emulsion polymerization process to prepare the comb compolymers used herein to form desirable blends (the comb copolymers are also referred to as "compatibilizers") are set forth in my parent '275 application. These criteria are relevant herein only to the extent that they provide details relating to preparation of the comb.

The expected difficulty with forming a desirable, either porous or essentially non-porous comb having a porosity less than 0.1, stems from using a macromer having a mol wt (determined by the hydroxyl number method) in excess of about 1000, preferably in the range from about 1000 to 100,000, and does not depend upon how the macromer is formed. The macromer of such mol wt may be formed in commercially acceptable yield by any known cationic or carbocationic ring-opening polymerization of a lactone, provided its formation leaves the macromer with a vinyl head group. Such processes are taught in the following references, inter alia.

U.S. Pat. Nos. 4,281,172 and 4,340,497 to Knopf, and 4,632,975 to Cornell, teach the preparation of macromers of polylactones by coupling reactions.

U.S. Pat. No. 3,655,631 to Fraser, teaches that lactones are polymerized in the presence of an ethylenically unsaturated amide or ester with a strong organic acid such as halogen activated carboxylic acids or sulfonic acids as catalyst, and a compound having the formula $L-CH_2OH$ as initiator, wherein L contains ethylenic unsaturation activated by amide or ester linkages, the ethylenic unsaturation being either $CH_2=CH<$ or $CH_2=CH-$. The acid has a pK value of less than 3 in water at 25° C.

U.S. Pat. No. 4,188,472 to Chang, discloses the polymerization of lactone in the presence of hydroxyalkyl (meth)acrylate with tetrabutyl titanate as the catalyst at 130° C.

U.S. Pat. No. 4,368,320 to Aldinger, discloses the polymerization of lactone in the presence of hydroxyalkyl (meth)acrylate with dialkyl tin oxide or glycolate at a temperature of from about 110° C. to about 125° C.

To cope with the problem of residual catalyst and minimize its effect, U.S. Pat. Nos. 4,504,635 and 4,683,287 to Weber, Jr. and Koleske, respectively, disclose the polymerization of lactone in the presence of hydroxyalkyl (meth)acrylate with less than 200 ppm of catalyst. Preferred catalysts are stannous octoate, dibutyl tin dilaurate, and other tin compounds; also, alkyl titanates such as butyl titanate. But the reaction has to be carried at a temperature in the range from about 100° C. to about 140° C., and though less than 2% by wt of diacrylate is said to be formed, no mention is made as to how this level of diacrylate was determined.

UK Patent Application GB 2,101,121A to Okitsu and Watanabe discusses numerous attempts to polymerize a lactone and obtain a polylactone-modified acrylic polyol.

As might be expected, the foregoing processes for providing the macromer produce diverse macromers some of which are more amenable than others for use in the production of the comb with desirably high mol wt, preferably greater than about 10,000, sufficient to provide compatibility between the comb and a single polymer with which it is to be blended, or, between the comb and two or more polymers with which it is to be blended. By "compatible blend", I mean a blend which has mechanical cohesion. Such cohesion is evident upon formation of the blend, and processing it. Such compatible blends may have separately identifiable phases, or a single phase when there is miscibility of the components. A mixture of the comb and polymer(s) may be blended to result in a smooth blend rather than a mixture having the consistency of "cottage cheese". It is not narrowly critical how preferred macromers are made, or whether they are OH terminated, or otherwise end-capped, provided they are effective to produce the combs used to make the blends of this invention.

SUMMARY OF THE INVENTION

It has been discovered that a comb copolymer of a macromer of polycaprolactone and a suitable monoolefinically unsaturated monomer provides an excellent combination to provide compatibility between substrate matrix resins which are otherwise incompatible.

It is therefore a general object of this invention to provide a comb copolymer having a number average molecular weight in excess of 10,000, the comb being formed with a polymerizable olefincially unsaturated monomer and a macromer of polylactone, the macromer having a terminal monoolefinically unsaturated head group.

It has also been discovered that the foregoing comb having a hydrocarbon backbone, made either by a suspension or an emulsion polymerization process has a sufficiently high mol wt so as to form a compatible blend with a synthetic resinous material which is incompatible with the hydrocarbon polymer backbone alone, but compatible with the pendant polylactone chains of the comb.

It is therefore a general object of this invention to provide a compatible blend of the foregoing comb with a polymer which is incompatible with the hydrocarbon polymer having the structure of the comb's backbone, but is compatible with the pendant polylactone chains of the comb.

It has further been discovered that the foregoing comb with a hydrocarbon backbone, made either by a suspension or an emulsion polymerization process, has a sufficiently high mol wt to form a compatible blend with at least two substrate matrix resins irrespective of whether they are compatible with each other, provided at least one of the materials is compatible with the pendant polylactone chains of the comb.

It is therefore a general object of this invention to provide a compatible blend of the foregoing comb with first and second polymers (substrate matrix resins), at least one of which is compatible with the pendant chains of macromer; the polymers may both be compatible with each other, or incompatible. The comb provides desirable improvement in physical properties. In one specific instance, one of the polymers is compatible with the hydrocarbon polymer having the structure of the comb's backbone, and the other polymer is compatible only with the pendant polylactone chains of the comb.

It is another specific object of this invention to provide a partially crosslinked comb copolymer of said macromer to produce a high molecular weight network which nevertheless has compatibility, but with limited miscibility, sufficient to disperse domains of said crosslinked comb copolymer blended with a synthetic resinous material to improve impact resistance, or some other properties of the blend.

It is a specific object of this invention to provide a compatible blend of a substrate matrix resin with the foregoing comb copolymer of a polymerizable olefinically unsaturated monomer and a macromer selected from a (i) homopolymer of lactone, (ii) random copolymers of at least one lactone, (iii) block copolymers of lactone-b-ether, or, of ether-b-lactone, provided the comb is made by the afore-described emulsion or suspension polymerization processes. The comb is useful in a wide range of synthetic resinous materials of commercial importance, for example, in (a) coatings, adhesives, inks, printing plates, and binders; (b) as compatibilizers and impact modifiers, processing aid and heat distortion temperature (HDT) improver in numerous polymers such as poly(vinyl chloride) (PVC), and polyblends, for example, of PVC with segmented copolyesters disclosed in U.S. Pat. No. 4,820,763 to Yang; and, the like.

It is a specific object to provide a polymer blend of a substrate matrix resin with a comb copolymer made from a macromer of polylactone, the macromer having an unsaturated acryloyl or methacryloyl (together "(meth)acryloyl") head group at one end and a terminal group at the other. Because of a relatively low polymerization temperature in a non-acidic reaction medium (slightly basic—pH in the range from 6 to 8), there is insignificant thermal self-polymerization of the (meth)acrylic head group. The polymerization proceeds by free radical polymerization, preferably in the presence of a redox catalyst for an emulsion polymerization, and the terminal group of each pendant polylactone-containing chain is preserved.

It is another specific object of this invention to provide both, a suspension and an emulsion polymerization process for the manufacture of a comb copolymer of (i) a macromer of polylactone having a number average mol wt greater than 1000 and an (meth)acryloyl functional head group and a terminal group at the tail, and (ii) a free-radical polymerizable olefinically unsaturated monomer, whereby the comb formed has a porosity less than 0.1 and a number average mol wt Mn greater than 10,000, preferably in the range from $10^4$ to $10^6$, more preferably from $10^5$ to $10^6$.

It is a specific object of this invention to provide a blend made with a comb in turn made by an emulsion polymerization process comprising, (a) preparing in a premix vessel, an aqueous non-acidic premix comprising a first surfactant in the absence of a co-solvent;

(b) preparing in a reaction vessel, an aqueous non-acidic reactor precharge comprising a redox catalyst and second surfactant, different from the first surfactant, and an electrolyte in amount sufficient to maintain a desirable ionic charge balance in the absence of a co-solvent;

(c) dissolving a macromer of polylactone having a mol wt greater than 1000 in the monomer only, to form a solution of macromer in monomer, the amount of monomer being sufficient to provide on average at least 2, preferably from 5 to 100 repeating units of monomer(s) per macromer unit in the comb copolymer to be formed, and adding the solution to the premix while agitating and purging the premix vessel with an inert gas;

(d) adding a minor portion by volume of the premix to the reaction vessel;

(e) initiating polymerization in the absence of a chain transfer agent, by adding sequentially to the reaction vessel a surfactant, reducing agent, oxygen scavenger and hydroperoxide catalyst ineffective at a temperature less than 70° C. in the absence of a redox catalyst;

(f) adding remaining premix in incremental quantities to the reaction vessel until polymerization is essentially completed while maintaining the contents of the reaction vessel in an emulsion at a temperature less than 70° C., preferably in the range from 40° C. to 60° C., (g) coagulating the emulsion with a salt to produce a coagulum of comb copolymer, and, (h) recovering the comb copolymer having a porosity less than 0.1 and pendant chains of substantially equal length.

It is a specific object of this invention to provide a blend made with a comb, in turn made by a suspension polymerization process comprising, (a) preparing in a reaction vessel, an aqueous non-acidic premix comprising a suspension agent in an amount sufficient to maintain a dispersion of microspheres of said monomer and macromer, and a first alkali metal-containing base, in the absence of a co-solvent, (b) agitating said premix while adding a solution of said macromer in said polymerizable monomer, the amount of monomer being sufficient to provide, on average at least 2, preferably 5 to 100 repeating units of monomer per macromer unit in the comb copolymer to be formed, (c) adding a free radical catalyst effective at a temperature below about 70° C. in an amount sufficient to form the comb copolymer at a temperature less than 70° C., and initiating polymerization in the absence of a chain transfer agent, and, (d) recovering the polymer in an essentially non-porous form having pendant chains of substantially equal length.

DETAILED DESCRIPTION OF PREFERRED EMBODIMENTS

The polylactone macromer is represented by the structure $$R-(M)_m-Z \qquad \text{(LM)}$$

wherein R represents a monolefinically unsaturated group having vinyl termination, the structure being written to emphasize the terminal group Z which is derived from either a ring-opening polymerization, or by end-capping, or coupling, M represents the polyester repeating unit of at least one said lactone which is ring-opened, m represents an integer in the range from 2 to about 500, more preferably from 2 to about 300, and, Z is the terminal group the identification of which depends upon the manner in which the macromer is produced, whether, for example, by ring-opening or end-capping. Z is preferably the residue of an end-capping unit selected from the group consisting of

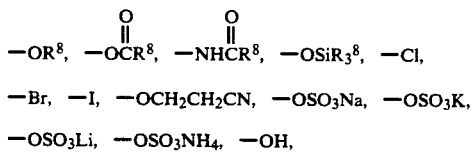

—Br, —I, —OCH$_2$CH$_2$CN, —OSO$_3$Na, —OSO$_3$K,

—OSO$_3$Li, —OSO$_3$NH$_4$, —OH, and the like, wherein R$^8$ is selected from the group consisting of hydrogen, C$_1$-C$_{20}$ alkyl and haloalkyl, and C$_6$-C$_{20}$ aryl and aralkyl.

The macromers of polylactones, end-capped or not end-capped, depending upon its structure, and the length of its chain, may be tailored to provide a wide variety of properties in polymers formed with them in subsequent polymerizations.

Comb copolymers of macromers of this invention may be derived from a macromer with one or more conventional ethylenically unsaturated monomers. The length to which the backbone is grown may be controlled by conventional means to provide the desired mol wt of the comb copolymer. It will be recognized that the length of each pendant polylactone chain is fixed by the mol wt of the macromer.

Monomers suitable for forming comb copolymers include:

(i) C$_2$-C$_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;

(ii) C$_8$-C$_{16}$ styryl monomers such as styrene, 4-chlorostyrene, alpha-methyl styrene, and the like;

(iii) alpha,beta-ethylenically unsaturated carboxylic acids having from 3 to 8 carbon atoms, and derivatives thereof selected from the group consisting of esters of C$_1$-C$_{20}$ alcohols such as ethyl acrylate, ethyl methacrylate, glycidyl acrylate, butyl acrylate; acrylamide and amides of C$_1$-C$_{20}$ amines such as N,N-dimethylacrylamide; and, metal salts such as sodium acrylate;

(iv) C$_4$-C$_8$ diene monomers such as butadiene and isoprene; and, (v) C$_5$-C$_{10}$ allylically unsaturated monomers such as allyl acetate, and diallylphthalate.

A preferred macromer is produced under mild conditions, by the cationic ring-opening polymerization of a lactone in conjunction with an alcohol and using an oxonium salt as the cationic ring-opening catalyst, as described in the parent case.

The cationically ring-openable lactone has the structure:

wherein, n is an integer chosen from 1, 3, 4 and 5;

R$^1$ is a group selected from C$_1$-C$_{20}$ alkyl (having from 1 to about 20 carbon atoms), preferably C$_1$-C$_6$ lower alkyl, cycloalkyl, alkoxy and phenyl, and the number of R$^1$ groups which are H is at least (n+2).

In the ethylenically unsaturated primary or secondary (meth)acryloyl alcohol used, the ethylenic unsaturation is adjacent a carbonyl group as in the structure

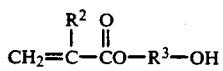

and, in a styryl or allylic alcohol, the ethylenic unsaturation is adjacent the phenyl ring, and the beta carbon atom respectively.

Most preferred among the lactones having structure (L), are the seven-membered rings, such as epsilon-caprolactone wherein n is 4, and at least 6 of R$^1$s are H, with the remainder of the R$^1$s being substituents selected from those identified hereinabove, provided the total number of C atoms in the —(CR$_2^1$)$_4$ groups does not exceed 12. Preferred substitutents are C$_1$-C$_{12}$ alkyl, for example, monoalkyl epsilon-caprolactones like methyl epsilon-caprolactone, or a mixture of isomeric methyl epsilon-caprolactones, or a mixture of isomeric methyl epsilon-caprolactones with epsilon-caprolactone, and dodecyl epsilon-caprolactone; also, dialkyl epsilon-caprolactones in which the two alkyl groups are substituted on the same or different C atoms, but not both on the epsilon C atom; and, trialkyl epsilon-caprolactones in which two or three C atoms in the lactone ring are substituted, but the epsilon C atom is not substituted.

Also usable are lactones having more than 6 C atoms in the ring, such as zeta-enantholactone and eta-caprylolactone, but they are less preferred. Substituted and unsubstituted epsilon-caprolactone are obtained by oxidizing the corresponding cyclohexanone, and the zeta-enantholactone from cycloheptanone.

Most preferred is a lactone selected from the group consisting of epsilon-caprolactone, beta-propiolactone, beta-butyrolactone, and delta-valerolactone.

Macromers of this invention have a number average mol wt Mn in the range greater than 1000 to about 10,000, corresponding to having from about 5 to 50 monomer repeating units per macromer unit. When the macromer is made by ring-opening of the lactone as described in the parent application, the mol wt is controlled by the ratio of lactone to acryloyl alcohol.

Most preferred is a (meth)acryloyl alcohol selected from the group consisting of 2-hydroxyethyl (meth)acrylate, hydroxypropyl (meth)acrylate, and 4-hydroxybutyl (meth)acrylate.

Hydroxyl number (OH No.) was determined by acetylation with an acetyl anhydride-pyridine mixture according to ASTM D-4274 procedure and the end point is determined by automatic titration. The OH No. is defined as the milligram equivalent of KOH per gram of the macromer, where a mole of KOH is equivalent to one mole of OH group.

Macromers may be formed having any of the structures (I)–(XII) hereinabove.

A random comb-shaped copolymer of macromer is prepared by polymerizing the macromer of polylactone having any structure (I)–(XII) hereinabove, with an olefinically unsaturated monomer so as to have the structure

(IV)

wherein $M_o$ represents the olefinically unsaturated monomer;

n' represents an integer in the range from 1 to about $10^4$, preferably $1$–$10^3$ and refers to the number of pendant OH-terminated polyester chains; and, n" represents an integer in the range from 1 to about $10^5$, more preferably $1$–$10^4$.

When the macromer used has structure (I) the comb formed has the structure

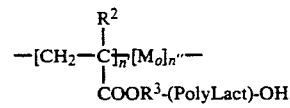

When the macromer used has the structure (II) the comb formed has the structure

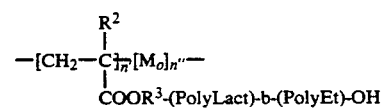

Similarly, macromers having structures (III)–(XII) may be used to form combs with a chosen monomer $M_o$.

Any of the foregoing comb copolymers may be formed with macromers having more than one lactone (L) to form macromers of random copolymers of the lactones used. Any of the macromers of at least one polylactone may also be used as the propagator to form block copolymers of lactone-b-lactone or lactone-b-ether by the action of the same cationic ring-opening catalysts identified hereinabove, under analogous, mild reaction conditions.

When the (meth)acryloyl-functional macromer of at least one polylactone is used as propagator, one can prepare macromers of block copolymers of lactone-b-lactone having the structure

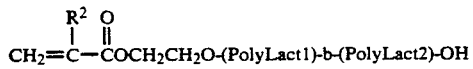

when different lactones are sequentially polymerized; or, of lactone-b-ether having the general structure

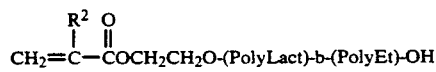

when a lactone and an alkylene oxide are sequentially polymerized.

Block copolymers having the structure (III) are prepared in which the polyether block has a number average molecular weight up to about 30,000, wherein PolyEt represents at least one cyclic ether such as:

(A) a 1,2-epoxide, for example (i) ethylene oxide, propylene oxide and the like; (ii) haloalkyl epoxides, for example, 1-chloro-2,3-epoxypropane (ECH), 3-chloro-4,5-epoxyoctane, and the like; and (iii) aliphatic or aromatic glycidyl ethers, for example, methyl glycidyl ether, ethyl glycidyl ether, phenyl glycidyl ether and the like;

(B) 1,3-epoxide, for example oxetane;

(C) a 1,4-epoxide, for example tetrahydrofuran (THF); and, (D) a 1,6-epoxide, for example oxepane (OXP). 1,4- and 1,6-epoxides do not homopolymerize but copolymerize with 1,2- or 1,3-epoxides.

For example, the macromer of block copolymer of monoacryloylethyl poly(lactone-b-ether) has the structure

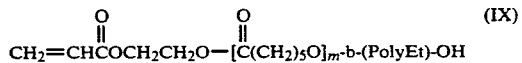
(IX)

wherein m is an integer in the range from 2 to about 500.

Other macromers of block copolymers may be made with a lactone and alkylene oxide of choice, such as caprolactone and propylene oxide, epichlorohydrin or tetramethylene oxide (THF), and any of the following conveniently available alcohols: methacryloylethyl alcohol, acryloylethyl alcohol, acryloylpropyl alcohol, and acryloylbutyl alcohol.

The terminal OH group of the lactone macromers (LM) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Patents Nos. 748,856; 848,660; 869,323; 877,256; 911,959; inter alia; or, by reacting with an alkylisocyanate as in British Patent No. 924,259; or, by reacting with diazomethane as in British Patent No. 894,439; or, by reacting with acrylonitrile or trialkylchlorosilane.

A preferred comb copolymer is made with a lactone macromer which contains the (meth)acryloyl head, and, one or more of the copolymerizable monomers preferably selected from (i)-(v), and more preferably from (i)-(iv). Free-radical chain polymerization, commonly used in the art, as described in "Encyclopedia of Polymer Science and Technology" Vol 7, Interscience Publishers, New York (1967), is preferred for all the polymerizations.

The catalyst chosen depends in part upon the particular monomers to be used and also upon the temperature at which the polymerization is to be caried out. It is preferred to carry out the polymerizations, whether in emulsion or suspension, at a temperature below about 70° C., though higher temperatures as high as about 90° C. may be used. In general, the higher the temperature of polymerization with the macromer, the lower the molecular weight of the comb formed. Preferred catalysts are the organic and inorganic peroxides, hydroperoxides, persulfates, perborates; the "redox" catalysts, and alkyl borane/oxidizing agent combinations, particularly those which are effective below 70° C. For emulsion polymerization, most preferred is a hydroperoxide catalyst which is ineffective below 70° C. in the absence of a redox catalyst.

Either in emulsion or suspension, the polymerization is best carried out in water in the presence of an effective suspending agent to obtain a granular comb polymer, or in the presence of an efficient dispersing agent to obtain a latex-like emulsion of polymer. Suitable suspending agents include the fatty alcohol sulfates, the alkarylsulfonates, and other such as sodium lauryl sulfate, sodium dodecyl benzene sulfonate, isobutyl naphthalene sodium sulfonate, the sodium salt of N-octadecyl-N-1,2-dicarboxyethyl sulfosuccinamate, and the like.

The preferred range for carrying out the polymerization is from about 40° C. to about 60° C.

Comb polymers formed with the macromer, and, an olefinically unsaturated monomer which provides a rubbery phase, such as ethyl acrylate, butyl acrylate or butadiene, optionally crosslinked to provide limited miscibility and to control the morphology of the elastomer, particularly to improve toughness or elasticity (elongation) in numerous commercially available polymers such as styrene/acrylonitrile, PVC and chlorinated PVC, poly(methylmethacrylate) and other polyesters, polycarbonates, polyacetals, polyurethanes and nylons. In the absence of pendant chains of polylactone, polyacrylates are not compatible with the resins, for example with PVC or polyurethane.

The comb copolymers may also be used to convert non-elastomeric thermoplastic resins into thermoplastic elastomers; for example to convert styrene/acrylonitrile, PVC, polyurethane, polycarbonate, polyacetal and nylon.

The comb copolymers may further be used to modify the physical properties of known thermoplastic elastomers such as block copolymers of styrene-butadiene-styrene.

The comb copolymer is thus particularly useful as an impact modifier when it is compatibly blended with a substrate matrix resin (polymer) present in a major amount by weight relative to the comb in the blend. As little as 1 part comb per 100 parts resinous material may be used, though larger amounts in the range from 1 to 40 parts, preferably from 5 to 30 parts, are more typically used. The compatibility of comb and resin in such a blend, is attributable to the miscibility or compatibility of domains formed by pendant chains of polylactone with the synthetic resinous phase. Additional miscibility, or greater compatibility of resin with such pendant chains may be obtained when the polylactone is blocked to polyether or vice versa, in the pendant chains.

Comb copolymers formed with the macromer of polylactone, and, an olefinically unsaturated monomer, such as styrene, methyl methacrylate or alpha-methyl styrene each of which provides a rigid phase, are useful as modifiers to improve HDT and/or physical strength in numerous commercially available resins. Such HDT improvement is obtained in a blend of "PVC" with the comb of macromer of polylactone and alpha-methyl styrene. The comb of polylactone and styrene improves physical strength in "PVC"; and the comb improves % elongation in blends containing an "ABS terpolymer" (of acrylonitrile, butadiene and styrene).

The term "PVC" is used generically herein to define not only poly(vinyl chloride), but also analogous polymers, such as poly(vinyl bromide), and chlorinated polyvinyl chloride; poly(vinylidene chloride) its derivatives; and vinyl chloride copolymers or terpolymers having vinyl chloride as the major component (greater than 50% by weight). These copolymers and terpolymers include comonomers of vinyl alkanoates such as vinyl acetate; vinylidene halides such as vinylidene chloride; alkyl esters of carboxylic acids such as acrylic acid, ethyl acrylate, and 2-ethylhexyl acrylate; unsaturated hydrocarbons such as ethylene, propylene, and isobutylene; and, allyl compounds, such as allyl acetate.

The term "ABS terpolymer" is used generically herein not only to define a terpolymer of but also analogous polymers in which the ABS comonomers have been replaced in whole or in part by analogous comonomers. For example, acrylonitrile is replaced by, or supplemented with methacrylonitrile, ethacrylonitrile, or halogenated acrylonitriles; styrene is replaced by, or supplemented with alpha-methyl styrene, chlorostyrene, or vinyl toluene; butadiene is replaced by, or supplemented with isoprene.

Substrate matrix resins in addition to "PVC" and "ABS terpolymer" which may be modified with the comb include other commonly available commercial polymeric materials. Referring to these generically and with ASTM D4000 acronyms in parentheses, additional polymers include poly(styrene-acrylonitrile) (SAN), poly(styrene-acrylonitrile-butadiene) (ABS), poly(styrene-acrylonitrile-acrylate) (ASA), poly(vinyl acetate), poly(vinylidene chloride-vinylacetate), poly(vinyl methyl ether) (PVME), chlorinated poly(vinyl chloride) (CPVC), chlorinated polyethylene (CPE), Phenoxy (polyhydroxypropylether of bisphenol A), poly(methylmethacrylate) (PMMA), poly(styrene-maleic anhydride) (SMA), poly(ethylene-vinyl acetate) (EVA), polybutyleneterephthalate (PBT), nylon (polyamide), polyethyleneterephthalate (PET), polyacetal (POM), polyamide (PA), polyurethane (PU), polyolefin (PO) and polycarbonate (PC).

The comb is particularly useful as a compatibilizer to form a blend of a first synthetic resinous material with a second such material which may be structurally so different from the first as to be incompatible with it. By "incompatible" is meant that any physical blending of as little as I part of one resin with the other results in the resins having no mechanical cohesion, and remaining separate and distinct as long as there is no compatibilizing agent present. There is no compatibility of one with the other. The blending of the comb with the first and second resins, together present in a major amount by weight relative to the comb in the blend, results in the formation of a compatible blend which in some instances may also be an essentially homogeneous one. Formation of such a blend is attributable to the first material being compatible with domains formed by pendant chains of the polylactone. The compatibilization of the resins with the pendant chains of the comb results in some instances, in a fine dispersion of one polymer in another; in other instances, it results in desired morphology obtained during processing.

The comb polymer is therefore useful as a compatibilizer present in a minor amount by weight, typically 1 to 25 parts, to improve the physical properties of numerous, important compatible polyblends commercially produced by the companies identified herebelow in conjunction with their trademarks, indicated with an asterisk. Such blends are of:

ABS/PVC known as Cycovin* by Borg-Warner, Lustran* by Monsanto, and Polyman* by A Schulman Inc.;
ABS/PC known as Bayblend* by Mobay, Pluse* by Dow Chemical, Triax* by Monsanto, and Proloy* by Borg-Warner;
ABS/nylon known as Elemid* by Borg-Warner, and Triax* by Monsanto;
ABS/SMA known as Cadon* by Monsanto;
PVC/ASA known as Geloy* by General Electric;
PVC/acrylic known as by Sumitomo and Kydex* by Rohm & Haas;
PVC/urethane known as Vythene* by Alpha Chem & Plastics;
PVC/CPE known as Hostalite* by American Hoechst;
PVC/nitrile rubber known as Vynite* by Alpha Chem & PLastics, Hycar* by BFGoodrich, and Paracril* by Uniroyal;
PVC/EVA known as Sumifraft* by Sumitomo, and Tennea* by Tenneco;
acetal/elastomer known as Celcon* by Celanese, Duraloy* by Celanese, Delrin* by DuPont, and Ultraform* by BASF;
PBT/PET known as Celanex* by Celanese and Valox* by General Electric;
PBT/elastomer known as Duralox*, Gafite* and Gaftuf* by Celanese, Valox* by General Electric, Ultradur* by BASF;
PBT/SMA known as Dylark* by Arco Chemicals;
PET/PMMA called Ropet* by Rohm & Haas;
PC/PBT/elastomer known as Xenoy* and Valox* by General Electric;
PC/PE known as Lexan* by General Electric and Merlon* by Mobay; PC/PET known as Xenoy* by General Electric and Makroblend* by Mobay;
PC/SMA known as Arloy* by Arco Chemical;
PC/TPU known as Texin* by Mobay;
PC/nylon known as Dexcarb* by Dexter Plastics;
PPO/high impact PS known as Noryl* by General Electric and Prevex* by Borg-Warner;
PPO/polyamide known as Noryl* by General Electric;
SMA/high impact PS known as Dylark* by Arco Chemical;
Nylon/elastomer known as Ultramid* by BASF;
Nylon/ethylene copolymer known as Capron* by Allied Chemical,
Nycoa* by Nylon Corp of America, Grilon* by Emser Industries;
Nylon/EPDM known as Zytel* by DuPont; and,
Nylon/PE known as Selar* by DuPont; to obtain a desired morphology known to be beneficial. The comb is most preferably used in blends of PVC/ABS; ABS/polycarbonate; ABS/nylon; and PVC/acrylonitrile-butadiene copolymer.

The comb copolymers are also useful as compatibilizers for blending two or more incompatible polymers. For example, comb copolymers formed with macromer and butyl acrylate are useful to form a fine dispersion of poly(butyl acrylate) in PVC to improve toughness of the PVC. Another example is that of comb copolmers formed with macromer and alpha-methyl styrene which are useful to form a fine dispersion of poly(alpha-methyl styrene) in PVC which increases HDT of the PVC. Still other examples are that of the comb copolymer of macromer with vinyl chloride which leads to a fine dispersion of polyester in PVC to facilitate recycling of waste PVC; and, of the same comb which leads to formation of a compatible blend of polyolefins with PVC.

A comb of macromer of polylactone with a backbone of alkyl acrylate having methacrylic acid units is a reactive compatibilizer for nylon and a polyester such as polyethylene terephtalate ("PET"). Dynamic crosslinking may be obtained with the addition of diisocyanate as the crosslinking agent during blending. Thus the morphology of the blend can be controlled.

The following illustrative examples describe the preparation of comb copolymers with a specific macromer of caprolactone and several acrylates by emulsion polymerization. Glossary of identifying names and symbols used in the following examples:

Gafac PE-510—alkylphenoxy poly(oxyethylene) ethyl phosphate
Sequestrene NaFe—sodium ferric ethylenediamine tetraacetic acid
PCL—macromer of polycaprolactone
Daxad 17—sodium salt of polymerized alkyl naphthalene sulfonic acid
PHMP—paramethane hydroperoxide
SFS—sodium formaldehyde sulfoxylate
Hampene 100—complexing agent for Fe

EXAMPLE 1

A premix was made by dissolving 20 g of a first surfactant, Gafac PE-510; and 0.1 g of a redox catalyst, Sequestrene NaFe in 750 ml demineralized water in a 2 liter premix flask. The pH was then adjusted to 6.5 with about 1 g of 50% caustic solution.

200 g of PCL macromer, Mn=3060, formed with 0.53 moles of hydroxyethylacrylate (HEA) and 17.54 moles of caprolactone, are dissolved in 800 g of ethylacrylate and 4 g of methacrylic acid. This solution is added to the premix with stirring to form an emulsion while the premix flask is purged with nitrogen.

To a 2-liter reaction flask equipped with a condenser and mechanical stirrer was added 487 ml of demineralized water, 5 g of Daxad 17, 3 g of sodium sulfate, and the premixed emulsion (269 g) of monomers from the premix flask. The reaction flask was then purged with nitrogen.

While under nitrogen, the reaction mixture was warmed to 75° C. and 0.47 g 55% active PHMP, 0.4 g SFS and 0.24 g of 35% active Hampene 100 were added so that the free radical polymerization was initiated. Then the remaining premix emulsion is proportioned into the reaction flask over a period of 3 hr with a metering pump. The total polymerization time is 5 hr and the temperature is maintained at 45° C.

A total solids content of 35.7% was obtained and indicated about 89% monomer conversion. The emulsion was coagulated with 2 wt % solution of Epsom salts in water. The isolated comb copolymer was washed with water and an antioxidant added before it is dried overnight at 60° C. The total weight of copolymer obtained was 854 g.

The copolymer has a Mooney viscosity of 22 (ML 11+4 at 100° C., ASTM D-1646) and a dilution solution viscosity of 1.64 g/ml as determined on a solution made up with 0.25 g copolymer in 100 ml methylethyl ketone (MEK). GPC analysis shows the copolymer has an average $Mn = 2.6 \times 10^5$ and the ratio of $Mw/Mn = 2.4$. Thermal characterization shows that the copolymer has a glass transition temperature $T_g$ of $-13°$ C. and a melting temperature $T_m$ in the range 16°–82° C. with an estimated heat of fusion of 5.8 cal/g. The copolymer is soluble in toluene tetrahydrofuran (THF), MEK and methylene chloride.

EXAMPLE 2

In a manner analogous to that illustrated in the foregoing example 1, a premix was made by dissolving 13 g of Gafac PE-510; and 0.07 g of Sequestrene NaFe in 529 ml demineralized water in a 2 liter premix flask. The pH was then adjusted to 6.5 with about 0.65 g of 50% caustic solution.

130 g of PCL macromer, Mn=1264, formed with 1.51 moles of hydroxyethylacrylate (HEA) and 17.54 moles of caprolactone, are dissolved in 520 g of n-butylacrylate and 4.88 g of diethylene glycol diacrylate (Sartomer SR-230) to provide some crosslinking. Such crosslinking is provided to increase the mol wt and limit miscibility, and at the same time to provide dispersed domains which improve impact strength. This solution is added to the premix with stirring to form an emulsion while the premix flask is purged with nitrogen.

To a 2-liter reaction flask equipped with a condenser and mechanical stirrer was added 750 ml of demineralized water, 3.25 g of Daxad 17, 1.95 g of sodium sulfate, and the premixed emulsion (178 g) of monomers from the premix flask. The reaction flask was then purged with nitrogen.

While under nitrogen, the reaction mixture was warmed to 45° C. and 0.37 g of 55% active PHMP, 0.26 g SFS and 0.16 g of 35% active Hampene 100 were added so that the free radical polymerization was initiated. Then the remaining premix emulsion is proportioned into the reaction flask over a period of 100 mins with a metering pump. The total polymerization time is 5 hr and the temperature is maintained at 45° C.

A total solids content of 39% was obtained and indicated about 100% monomer conversion. The emulsion was coagulated with 2 wt % solution of Epsom salts in water. The isolated comb copolymer was washed with water and an antioxidant added before it is dried overnight at 60° C.

The copolymer has a Mooney viscosity of 54 (ML 11+4 at 100° C., ASTM D-1646). Thermal characterization shows that the copolymer has a $T_g$ of $-47°$ C. and a $T_m$ in the range 8°–73° C. with an estimated heat of fusion of 2.3 cal/g.

EXAMPLE 3

In a manner analogous to that illustrated in the foregoing example 2, a premix was made by dissolving 10 g of Gafac PE-510; and 0.05 g of Sequestrene NaFe in 529 ml demineralized water in a 2 liter premix flask. The pH was then adjusted to 6.5 with about 0.5 g of 50% caustic solution.

100 g of PCL macromer, Mn=1264, formed with 1.51 moles of hydroxyethylacrylate (HEA) and 17.54 moles of caprolactone, are dissolved in 400 g of 2-ethylhexyl acrylate and 3.75 g of diethylene glycol diacrylate (Sartomer SR-230) to provide some crosslinking. This solution is added to the premix with stirring to form an emulsion while the premix flask is purged with nitrogen.

To a 2-liter reaction flask equipped with a condenser and mechanical stirrer was added 375 ml of demineralized water, 2.5 g of Daxad 17, 1.5 g of sodium sulfate, and the premixed emulsion (137 g) of monomers from the premix flask. The reaction flask was then purged with nitrogen.

While under nitrogen, the reaction mixture was warmed to 75° C. and 0.27 g of 55% active PHMP, 0.2 g SFS and 0.1 g of 35% active Hampene 100 were added so that the free radical polymerization was initiated. Then the remaining premix emulsion is proportioned into the reaction flask over a period of 90 mins with a metering pump. The total polymerization time is 5 hr and the temperature is maintained at 45° C.

A total solids content of 39% was obtained and indicated about 100% monomer conversion. The emulsion was coagulated with 2 wt % solution of Epsom salts in water. The isolated comb copolymer was washed with water and an antioxidant added before it is dried overnight at 60° C. A total of 443 g of gummy copolymer was obtained.

Thermal characterization shows that the copolymer has a $T_g$ of $-63°$ C. and a $T_m$ in the range 9°–75° C. with an estimated heat of fusion of 2.1 cal/g.

EXAMPLE 4

In a manner analogous to that illustrated in the foregoing example 3, a premix was made by dissolving 10 g of Gafac PE-510; and 0.05 g of Sequestrene NaFe in 375 ml demineralized water in a 2 liter premix flask. The pH was then adjusted to 6.5 with about 0.5 g of 50% caustic solution.

125 g of PCL macromer, Mn=1160, formed with 0.14 moles of hydroxyethylacrylate (HEA) and 1 mole of caprolactone, are dissolved in 125 g of ethyl acrylate and 250 g of n-butyl acrylate. This solution is added to the premix with stirring to form an emulsion while the premix flask is purged with nitrogen.

To a 2-liter reaction flask equipped with a condenser and mechanical stirrer was added 375 ml of demineralized water, 2.5 g of Daxad 17, 1.5 g of sodium sulfate, and the premixed emulsion (133 g) of monomers from the premix flask. The reaction flask was then purged with nitrogen.

While under nitrogen, the reaction mixture was warmed to 45° C. and 0.42 g of 55% active PHMP, 0.2 g SFS and 0.12 g of 35% active Hampene 100 were added so that the free radical polymerization was initiated. Then the remaining premix emulsion is proportioned into the reaction flask over a period of 135 mins with a metering pump. The total polymerization time is 4.5 hr and the temperature is maintained at 45° C.

A total solids content of 32.6% (86% conversion) was obtained and indicated about 97% monomer conversion. The emulsion was coagulated with 2 wt % solution of Epsom salts in water. The isolated comb copolymer was washed with water and an antioxidant added before it is dried overnight at 60° C. A total of 457 g of comb copolymer was obtained.

Carbon-13 NMR shows the comb has a composition of 55 wt % n-butyl acrylate (n-BtA), 23 wt % ethyl acrylate (EtA), and 22 wt % caprolactone. The terpolymer has a Mooney viscosity of 43 (ML 11+4 at 100° C., ASTM D-1646). Rheometrics Mechanical Spectrometer at 1 rad/sec oscillation frequency shows the terpolymer has complex viscosities of $6 \times 10^8$ poise at $-30°$ C. $2.6 \times 10^6$ poise at 10° C., $6 \times 10^5$ poise at 50° C., $4 \times 10^5$ at 90° C., and $1.9 \times 10^5$ poise at 210° C. Thermal characterization shows that the copolymer has a $T_g$ of $-41°$ C. and a $T_m$ in the range 10°-75° C.

Instrumented Dart Impact Evaluation Tests with a Blend of Comb Terpolymer with Poly(vinyl chloride):

20 parts by weight of the comb terpolymer of macromer produced in Example 4, is blended with 80 parts by weight of Geon ®87426 poly(vinyl chloride) on a two-roll mill at about 300° F., sheeted, diced, and compression molded into samples 2 ins×2 ins square and an average thickness of 0.073 in. The sample was then subjected to a test in which a high energy dart (23 lbs) with an initial impact velocity of 133 ins/sec was used at 21° C. with a 1 inch retainer ring.

For comparison, essentially identical squares were compression molded from the Geon 87426 PVC alone, used as one control sample, and from Geon 87426 PVC (80 parts) and Kane Ace B-22 (20 parts), a commercially available impact modifier for PVC.

The following Table I sets forth the notched Izod impact data of the samples, indicating a substantial increase due to the presence of the comb terpolymer.

TABLE 1

| Sample | Izod impact (ft-lb/in) |
|---|---|
| 17A - Geon ® 87426 PVC only | 0.8 |
| 17B - Geon ® 87426 PVC + 20 parts Kane Ace B-22 | 15.8 |
| 17C - Geon ® 87426 PVC + 20 parts n-BtA-EtA/PCL | 14. |

The following Table 2 presents data for the instrumented drop tester.

TABLE 2

| Sample | Max. force (lb) | Total Energy (in-lbs) | $E_i$* (in-lbs) | $E_p$♦ (in-lbs) |
|---|---|---|---|---|
| 17A | 459 | 127 | 78 | 49 |
| 17B | 532 | 178 | 111 | 67 |
| 17C | 502 | 201 | 116 | 85 |

*$E_i$ = initiation energy.
♦$E_p$ = propogation energy

Samples 17A and 17B showed higher scatter of data and greater standard deviation than the sample 17C. The high standard deviation is attributable to several factors including non-homogeneity or internal stresses in the samples. Both ductile and brittle failures were observed for samples 17A and 17B. Maximum force of impact is similar to that obtained with the commercial impact modifier (17B). The total impact energy $E_t$ which equals $E_i + E_p$ is slightly higher for sample 17C than that for 17B.

10 parts by weight of the comb terpolymer produced in Example 4 are blended with 90 parts of chlorinated poly(vinyl chloride) ("CPVC"), tin stabilizer and lubricant on a two-roll mill at 375° F.

The matrix base compound is blended with the following:

| Component | phr |
|---|---|
| CPVC designated by code 688X512 | 88 |
| Alastab 777 | 1.8 |
| AC 629A | 1.5 |
| Stearic acid | 0.5 |
| Titanium dioxide | 5. |
| Impact modifier to be tested | 10. |

The sheeted blend is diced into pieces and injection molded into test specimens for testing. Control test samples are also injection molded using Paraloid KM-330 (a commercial impact modifier). The following results were obtained.

TABLE 3

|  | w/comb terpolymer | w/Paraloid |
|---|---|---|
| HDT, °C. annealed (264 psi, 0.125 inch) | 81 | 89 |
| Notched Izod, ft-lb/in | 1.2 | 2.0 |
| Reverse Notch Izod, ft-lb/in | 52NB | 52NB |
| Melt index, gm/10 min (205° C., 8700 gram load) | 15.8 | 13.8 |
| Specific gravity | 1.46 | 1.47 |

The lower HDT indicates better compatibility with CPVC than with the commercial impact modifier used. This better compatibility is also reflected in the slightly lower notched Izod, though the impact strength was improved relative to the CPVC without an impact modifier.

EXAMPLE 5

A comb copolymer of ethyl acrylate, butyl acrylate, and macromer of polycaprolactone from Example 4 was blended with PVC and yielded a uniform blend. Without the pendant chains of caprolactone, a homopolymer of either ethyl acrylate or butyl acrylate, or a copolymer of ethyl acrylate and butyl acrylate, produces a "cottage cheese" when blended with PVC substrate. Blends containing a minor proportion by weight of the comb contain from 1 to less than 50 parts of comb copolymer mixed with from more than 50 to 99 parts substrate PVC. The ratio of comb to substrate ranges from about 1:49 parts comb to 99:51 parts substrate.

80 parts Geon ®87426 PVC was blended with 20 parts comb at 180° C. for 3 min in a Brabender mixer. The blend from the Brabender is then molded at 180° C. and 2000 psi for 2 min to provide a sheet which was cut and tested for its physical properties which are listed in Table 4 below. The physical properties are compared with moldable PVC resin by itself, and the resin which has been modified with Kane Ace 13-22, a commercially available impact modifier. All amounts of components are specified in parts by weight.

TABLE 4

| PVC | 100 | 85 | 80 |
|---|---|---|---|
| Kane Ace 13-22 | — | 15 | — |
| Comb | — | — | 20 |
| Tensile, max, $10^3$ psi | 7.6 | 5.8 | 4.3 |
| Modulus, $10^5$ psi | 4.4 | 3.3 | 2.7 |
| % Elongation | 180 | 140 | 180 |
| Hardness, Durometer "D" | 84 | 82 | 72 |

TABLE 4-continued

| | | | |
|---|---|---|---|
| $T_g$, °C. | 82 | 83 | 72 |
| HDT, 264 psi, °C. | 71 | 72 | 63 |
| Izod impact, ft-lb/in | 0.8 | 15.8 | 14.0 |
| Instrumented Dart impact: | | | |
| Max force, lb | 459 | 532 | 502 |
| Total Energy, in-lb | 127 | 178 | 201 |
| Initiation Energy, in-lb | 78 | 111 | 116 |
| Propagation Energy, in-lb | 49 | 67 | 85 |

As is evident, the comb not only makes the acrylic elastomer component of the comb compatible with the PVC, but also improves its impact strength to nearly the same extent as the Kane Ace 13-22. The compatibility of the comb with the PVC is confirmed by the lowered $T_g$ and heat distortion temperature of the blend.

EXAMPLE 6

A comb copolymer of ethyl acrylate, butyl acrylate, and macromer of polycaprolactone from Example 4 was blended with CPVC and yielded a uniform blend. Without the pendant chains of caprolactone, a homopolymer of either ethyl acrylate or butyl acrylate, or a copolymer of ethyl acrylate and butyl acrylate, produces a "cottage cheese" when blended with CPVC substrate in the range from 1:50 parts polymer to 99:50 parts substrate CPVC.

90 parts of CPVC (Temprite® 688×512) was blended with 10 parts of comb copolymer, 1.8 parts of Atlastab 777 organotin stabilizer, and 1.0 part of AC6-29A oxidized polyethylene, on a 2-roll mill at 375° F. to yield a smooth and homogeneous blend. The blend was then cubed and injection molded into test specimens for testing. The results of the tests are as follows:

TABLE 5

| Component & Test | | |
|---|---|---|
| CPVC, Temprite ® 688x512 | 100 | 90 |
| Atlastab 777 | 1.8 | 1.8 |
| AC 629A | 1.0 | 1.0 |
| Comb copolymer | — | 10 |
| Tensile, psi | 8618 | 7075 |
| % Elongation | 76 | 125 |
| HDT, °C. (264 psi, 0.125", annealed) | 93 | 80 |
| Vicat, °C. (B) | 95 | 89 |

It is evident that the ductility of the blend is significantly improved as indicated by the percent elongations. The reduced Vicat and HDT of the blend indicates over-compatibility between the comb copolymer and the CPVC resin.

EXAMPLE 7

A comb copolymer of ethyl acrylate, butyl acrylate, and macromer of polycaprolactone from Example 4 was blended with polycarbonate and yielded a uniform blend. Without the pendant chains of caprolactone, a homopolymer of either ethyl acrylate or butyl acrylate, or a copolymer of ethyl acrylate and butyl acrylate, produces a "cottage cheese" when blended with a polycarbonate substrate in the range from 1:50 parts polymer to 99:50 parts substrate polycarbonate.

80 parts of Lexan 141 PC was blended with 20 parts of comb copolymer at 225° C. for 5 min in a Brabender mixer. An opaque but uniform blend was obtained.

EXAMPLE 8

A comb copolymer of ethyl acrylate, butyl acrylate, and macromer of polycaprolactone from Example 4 was blended with polyacetal and yielded a uniform blend. Without the pendant chains of caprolactone, a homopolymer of either ethyl acrylate or butyl acrylate, or a copolymer of ethyl acrylate and butyl acrylate, produces a "cheese" when blended with a polyacetate substrate in the range from 1:50 parts polymer to 99:50 parts substrate polyacetal.

72 parts of Celcon M270-04 polyacetal was blended with 18 parts of comb copolymer at 195° C. for 5 min in a Brabender mixer. An opaque but uniform blend was obtained.

EXAMPLE 9

A comb copolymer of ethyl acrylate, butyl acrylate, and macromer of polycaprolactone from Example 1, 2 and 4 was blended with Estane* 58206 polyurethane and yielded a uniform blend. Without the pendant chains of caprolactone, a homopolymer of either ethyl acrylate or butyl acrylate, or a copolymer of ethyl acrylate and butyl acrylate, produces a "cottage cheese" when blended with a polyurethane substrate in the range from 1:50 parts comb copolymer to 99:50 parts substrate polyurethane.

80 parts of the Estane* was blended with 20 parts of a comb copolymer at 200° C. for 5 min in a Brabender mixer, then molded at 200° C. and 2000 psi for 3 min. The test samples were then cut in a die into a dumbbell shape ("died-out").

The comb copolymer of Example 1 is a copolymer of ethyl acrylate with 20 wt % of macromer of polycaprolactone; of Example 2 is a copolymer of n-butyl acrylate with 18.7 wt % of macromer of caprolactone; of Example 4 is a copolymer of ethyl acrylate, butyl acrylate, and macromer of caprolactone in the ratio 25:50:25 by weight.

TABLE 6

| Comb copolymer | Ex 1 | Ex 2 | Ex 4 |
|---|---|---|---|
| Tensile, psi | 6884 | 3624 | 2659 |
| % Elongation | 630 | 582 | 501 |

EXAMPLE 10

A comb copolymer of polycaprolactone and styrene was prepared as follows:

To a 1 liter glass round-botomed flask add 300 ml demineralized water, 0.5 g of Vinol 540 polyvinyl alcohol as a suspension stabilizer, and 0.004 g of sodium salt of 2,4-dinitrobenzene sulfonic acid. Then the mixture of 75 g of styrene, 25 g of macromer of polycaprolactone having a number average molecular weight of 2600, and 0.75 g Esporox 28 t-butylperoctoate initiator was added to the flask. The contents of the flask are heated to 90° C. and the polymerization was carried out for 7 hr with a conversion greater than 82%. GPC analysis shows the comb copolymer has a broad molecular weight distribution having a peak at $3.9 \times 10^4$.

Using the comb copolymer prepared above, a 50:50 blend of Lexan 141 polycarbonate and Lustran 743 ABS is prepared and compared with a blend of the same materials except that the comb copolymer is added as the compatibilizer. The ratio of comb: ABS: polycarbonate is 5:50:50 parts by weight.

The physical properties of the blends are compared in the following Table 7.

TABLE 7

|  | No Comb | With Comb |
|---|---|---|
| Tensile, psi | 7800 | 7573 |
| % Elongation | 41 | 81 |

It is evident that the % elongation has been nearly doubled.

Electron micrographs of each sample taken at a cryo-fractured surface with a SEM (scanning electron microscope) show that the grain size of the blend with the comb is smaller than that of the blend without the comb.

In comb copolymers used in each of the foregoing examples, the pendant chains of polylactone are present in a minor proportion by weight relative to the hydrocarbon backbone, typically from 3 to 45 parts of pendant chains, preferably 10 to 20 parts, and from 97 to 55 parts of hydrocarbon backbone, preferably from 90 to 80 parts. The higher proportion of pendant chains in the range becomes progressively more difficult to achieve due to increasing steric hindrance.

Having thus provided a general discussion, and specific illustrations of the best mode for preparing a blend of at least one substrate matrix resin with a comb copolymer of macromer of polylactone and of macromers of block copolymers thereof, with a monomer with terminal vinyl unsaturation, it is to be understood that no undue restrictions are to be imposed by reason thereof.

We claim:

1. A compatible blend of at least one synthetic substrate matrix resin present in a major amount by weight in said blend, and a comb copolymer of a polymerizable olefinically unsaturated monomer and a macromer of polylactone, wherein said comb copolymer has a hydrocarbon backbone and said macromer of polylactone is represented by the structure $$R—(M)_m—Z \qquad (LM)$$

wherein R represents a monoolefinically unsaturated vinyl group,

M represents the polyester repeating unit of at least one said lactone which is ring-opened, m represents an integer in the range from 2 to about 500, and, Z is a terminal group derived from a ring-opening polymerization or by a coupling reaction.

2. The blend of claim 1 wherein Z is selected from the group consisting of $$—OR^8, \quad —O\overset{O}{\underset{\|}{C}}R^8, \quad —NH\overset{O}{\underset{\|}{C}}R^8, \quad —OSiR_3^8, \quad —Cl,$$

$$—Br, \quad —I, \quad —OCH_2CH_2CN, \quad —OSO_3Na, \quad —OSO_3K,$$

$$—OSO_3Li, \quad —OSO_3NH_4, \text{ and } —OH,$$

wherein $R^8$ is selected from the group consisting of hydrogen, $C_1$–$C_{20}$ alkyl and haloalkyl, and $C_6$–$C_{20}$ aryl and aralkyl;

3. The blend of claim 2 wherein said matrix resin is selected from the group consisting of poly(vinyl chloride) (PVC), poly(styrene-acrylonitrile) (SAN), poly(styrene-acrylonitrile-butadiene) (ABS), poly(styrene-acrylonitrileacrylate) (ASA), poly(vinyl acetate), poly(vinylidene chloride-vinylacetate), poly(vinyl methyl ether) (PVME), chlorinated poly(vinyl chloride) (CPVC), chlorinated polyethylene (CPE), Phenoxy (polyhydroxypropylether of bisphenol A), polyacetal (POM), poly(methylmethacrylate) (PMMA), poly(styrene-maleic anhydride) (SMA), poly(ethylenevinyl acetate) (EVA), polybutyleneteraphthalate (PBT), polyethyleneterephthalate (PET), polyacetal (POM), polyamide (PA), polyurethane (PU), nylon (polyamide), polyolefin (PO) and polycarbonate (PC).

4. The blend of claim 2 wherein m is in the range from 2 to about 300.

5. The blend of claim 2 wherein a single substrate matrix resin is present.

6. The blend of claim 2 wherein at least two substrate matrix resins are present, and one is incompatible with at least one other.

7. The blend of claim 2 wherein only two substrate matrix resins are present, and each is compatible with the other.

8. The blend of claim 2 wherein pendant chains of said comb copolymer are provided by a macromer having the structure $$R^1CH—(CR_2^1)_n—C=O \qquad (L)$$
$$\underset{\phantom{R^1CH—(CR_2^1)_n—}}{|\underline{\qquad\qquad\qquad}O}$$

wherein, n is an integer chosen from 1, 3, 4 and 5;

$R^1$ is a group selected from hydrogen, $C_1$–$C_{20}$ alkyl, cycloalkyl, alkoxy and phenyl, and the number of $R^1$ groups which are H is at least (n+2).

9. The blend of claim 8 wherein said comb copolymer has the structure $$—[R]_{n'}—[M_o]_{n''}— \qquad (IV)$$
$$\qquad\quad |$$
$$\quad\;\;[M]_m$$
$$\qquad\quad |$$
$$\qquad\quad Z$$

wherein $M_o$ represents the olefinically unsaturated monomer;

n' represents an integer in the range from 1 to about $10^4$, and refers to the number of pendant OH-terminated polyester ester chains; and, n" represents an integer in the range from 1 to about $10^5$.

10. The blend of claim 9 wherein, n' represents an integer in the range from 1–$10^3$; n" represents an integer in the range from 1–$10^4$; and, said pendant chains are present in a minor proportion by weight relative to said hydrocarbon backbone.

11. The blend of claim 10 wherein said lactone is selected from the group consisting of epsilon-caprolactone, beta-propiolactone, beta-butyrolactone, and delta-valerolactone.

12. The blend of claim 11 wherein, n' represents an integer in the range from 2–500; n" represents an integer in the range from 2–$10^4$; said pendant chains are present in the range from 3 to 45 parts, and said hydrocarbon backbone is present in the range from 97 to 55 parts.

13. The blend of claim 12 wherein, said R is selected from the group consisting of (i) an acryloyl or methacryloyl group wherein the ethylenic unsaturation is adjacent a carbonyl group, (ii) a styrylically unsaturated group wherein the ethylenic unsaturation is adjacent an aromatic ring, and, (iii) an allylically unsaturated group.

14. The blend of claim 13 wherein said polymerizable olefinically unsaturated monomer is selected from the group consisting of:
   (i) $C_2-C_{12}$ vinyl monomers;
   (ii) $C_8-C_{16}$ styryl monomers; (iii) alpha,beta-ethylenically unsaturated carboxylic acids having from 3 to 8 carbon atoms, and derivatives thereof selected from the group consisting of esters of $C_1-C_{20}$ alcohols;
   (iv) $C_4-C_8$ diene monomers; and,
   (v) $C_5-C_{10}$ allylically unsaturated monomers.

15. The blend of claim 14 wherein said vinyl monomer (i) is selected from the group consisting of vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, and N-vinyl carbazole; said styryl monomer (ii) is selected from the group consisting of styrene, 4-chlorostyrene, and alpha-methyl styrene; said alpha,beta-ethylenically unsaturated carboxylic acid and derivative thereof (iii) is selected from the group consisting of metal salts of said acid; ethyl acrylate, ethyl methacrylate, glycidyl acrylate, butyl acrylate; acrylamide, and amides of $C_1-C_{20}$ amines; said diene monomer (iv) is selected from the group consisting of butadiene and isoprene; and, said allylically unsaturated monomer (v) is selected from the group consisting of allyl acetate and diallylphthalate.

16. The blend of claim 12 wherein said $M_o$ is an alkyl ester of a monoolefinically unsaturated carboxylic acid, said lactone is caprolactone, and said substrate matrix resin which is the only matrix resin present, is selected from the group consisting of poly(vinyl chloride), chlorinated poly(vinyl chloride), polycarbonate, polyacetate, polyurethane and polyacetal.

17. The blend of claim 12 wherein said $M_o$ is styrene, said lactone is caprolactone, and, polycarbonate (PC) and acrylonitrile-butadiene-styrene (ABS) are the only substrate matrix resins present.

18. A compatible blend of a synthetic substrate matrix resin present in a major amount by weight in said blend, and a comb copolymer of (a) macromer of polylactone and (b) a polymerizable olefinically unsaturated monomer in which a portion of said macromer is soluble, said comb being produced with pendant chains having substantially equal length, said comb copolymer being formed by a free radical polymerization process and, said substrate matrix resin is selected from the group consisting of poly(vinyl chloride) (PVC), poly(styrene-acrylonitrile) (SAN), poly(styrene-acrylonitrile-butadiene) (ABS), poly(styrene-acrylonitrile-acrylate) (ASA), poly(vinyl acetate), poly(vinylidene chloride-vinylacetate), poly(vinyl methyl ether) (PVME), chlorinated poly(vinyl chloride) (CPVC), chlorinated polyethylene (CPE), Phenoxy (polyhydroxypropylether of bisphenol A), polyacetal (POM), poly(methylmethacrylate) (PMMA), poly(styrene-maleic anhydride) (SMA), poly(ethylene-vinyl acetate) (EVA), polybutyleneterephthalate (PBT), polyethyleneterephthalate (PET), polyacetal (POM), polyamide (PA), polyurethane (PU), nylon (polyamide), polyolefin (PO) and polycarbonate (PC).

19. The blend of claim 18 wherein, said comb copolymer has the structure

wherein $M_o$ represents the olefinically unsaturated monomer;
n' represents an integer in the range from 1 to about $10^4$, and refers to the number of pendant OH-terminated polyester chains; and, n" represents an integer in the range from 1 to about $10^5$; said macromer is represented by the structure

wherein, n is an integer chosen from 1, 3, 4 and 5; +
$R^1$ is a group selected from hydrogen, $C_1-C_{20}$ alkyl, cycloalkyl, alkoxy and phenyl, and the number of $R^1$ groups which are H is at least (n+2); said R is selected from the group consisting of
(i) an acryloyl or methacryloyl group wherein the ethylenic unsaturation is adjacent a carbonyl group,
(ii) a styrylically unsaturated group wherein the ethylenic unsaturation is adjacent an aromatic ring, and,
(iii) an allylically unsaturated group; and, said polymerizable olefinically unsaturated monomer is selected from the group consisting of:
(i) $C_2-C_{12}$ vinyl monomers;
(ii) $C_8-C_{16}$ styryl
(iii) alpha,beta-ethylenically unsaturated carboxylic acids having from 3 to 8 carbon atoms, and derivatives thereof selected from the group consisting of esters of $C_1-C_{20}$ alcohols;
(iv) $C_4-C_8$ diene monomers; and,
(v) $C_5-C_{10}$ allylically unsaturated monomers.

20. A compatible blend of (A) two or more substrate matrix resins together present in a major amount by weight in said blend, irrespective of whether said materials are incompatible with each other, and (B) a comb copolymer of (a) macromer of polylactone and (b) a polymerizable olefinically unsaturated monomer in which a portion of said macromer is soluble, at least one of said substrate matrix resins being compatible with pendant chains of said polylactone, said comb being produced with pendant chains having substantially equal length by a free radical polymerization process, and, wherein one of said substrate matrix resins is selected from the group consisting of poly(vinyl chloride) (PVC), poly(styrene-acrylonitrile) (SAN), poly(styrene-acrylonitrile-butadiene) (ABS), poly(styrene-acrylonitrile-acrylate) (ASA), poly(vinyl acetate), poly(vinylidene chloride-vinylacetate), poly(vinyl methyl ether) (PVME), chlorinated poly(vinyl chloride) (CPVC), chlorinated polyethylene (CPE), Phenoxy (polyhydroxypropylether of bisphenol A), poly(methylmethacrylate) (PMMA), poly(styrene-maleic anhydride) (SMA), poly(ethylene-vinyl acetate) (EVA), polybutyleneterephthalate (PBT), polyethyleneterephthalate (PET), polyacetal (POM), polyamide (PA), polyurethane (PU), polyolefin (PO) and polycarbonate (PC).

21. The blend of claim 20 wherein, said comb copolymer has the structure $$-[R]_{n'}-[M_o]_{n''}- \atop {|\atop [M]_m \atop |\atop Z}} \quad \text{(IV)}$$

wherein $M_o$ represents the olefinically unsaturated monomer;

n' represents an integer in the range from 1 to about $10^4$, and refers to the number of pendant OH-terminated polyester chains; and, n" represents an integer in the range from 1 to about $10^5$; said macromer is represented by the structure $$R^1CH-(CR_2^1)_n-C=O \atop {\underline{\hspace{2cm}}O}} \quad \text{(L)}$$

wherein, n is an integer chosen from 1, 3, 4 and 5;
$R^1$ is a group selected from hydrogen, $C_1-C_{20}$ alkyl, cycloalkyl, alkoxy and phenyl, and the number of $R^1$ groups which are H is at least (n+2); said R is selected from the group consisting of
(i) an acryloyl or methacryloyl group wherein the ethylenic unsaturation is adjacent a carbonyl group,
(ii) a styrylically unsaturated group wherein the ethylenic unsaturation is adjacent an aromatic ring, and,
(iii) an allylically unsaturated group; and, said polymerizable olefinically unsaturated monomer is selected from the group consisting of:
(i) $C_2-C_{12}$ vinyl monomers;
(ii) $C_8-C_{16}$ styryl monomers;
(iii) alpha,beta-ethylenically unsaturated carboxylic acids having from 3 to 8 carbon atoms, and derivatives thereof selected from the group consisting of esters of $C_1-C_{20}$ alcohols;
(iv) $C_4-C_8$ diene monomers; and,
(v) $C_5-C_{10}$ allylically unsaturated monomers.

22. A process for preparing a polymer blend comprising, depositing at least one synthetic substrate matrix resin in a mixing zone, adding thereto a comb copolymer of a polymerizable olefinically unsaturated monomer and a macromer of polylactone, and mixing at a sufficiently high temperature and for enough time, until compatibly blended therewith, said matrix resin being present in said mixing zone in a major amount by weight, and said comb copolymer being present in a minor amount by weight, said comb copolymer having a hydrocarbon backbone and said macromer of polylactone being represented by the structure $$R-(M)_m-Z \quad \text{(LM)}$$

wherein R represents a monoolefinically unsaturated vinyl group,
M represents the polyester repeating unit of at least one said lactone which is ring-opened,
m represents an integer in the range from 2 to about 500, and,
Z is a terminal group derived from a ring-opening polymerization or by a coupling reaction, selected from the group consisting of $$-OR^8, \; -O\overset{O}{\overset{\|}{C}}R^8, \; -NH\overset{O}{\overset{\|}{C}}R^8, \; -OSiR_3^8, \; -Cl,$$
$$-Br, \; -I, \; -OCH_2CH_2CN, \; -OSO_3Na, \; -OSO_3K,$$
$$-OSO_3Li, \; -OSO_3NH_4, \; \text{and} \; -OH,$$

wherein $R^8$ is selected from the group consisting of hydrogen, $C_1-C_{20}$ alkyl and haloalkyl, and $C_6-C_{20}$ aryl and aralkyl.

* * * * *